US009165202B2

(12) United States Patent
Sugasawa et al.

(10) Patent No.: US 9,165,202 B2
(45) Date of Patent: Oct. 20, 2015

(54) RECOGNITION SYSTEM, RECOGNITION METHOD AND COMPUTER READABLE MEDIUM FOR CALCULATING FEATURE VALUES OF AN OBJECT IMAGE

(71) Applicant: Toshiba Tec Kabushiki Kaisha, Tokyo (JP)

(72) Inventors: Hiroshi Sugasawa, Miyagi (JP); Hitoshi Iizaka, Shizuoka (JP); Hidehiro Naito, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 313 days.

(21) Appl. No.: 13/769,702

(22) Filed: Feb. 18, 2013

(65) Prior Publication Data
US 2013/0223680 A1 Aug. 29, 2013

(30) Foreign Application Priority Data

Feb. 24, 2012 (JP) .................................. 2012-038552

(51) Int. Cl.
G06K 9/00 (2006.01)
G06K 9/32 (2006.01)
G07G 1/00 (2006.01)

(52) U.S. Cl.
CPC ............ *G06K 9/3241* (2013.01); *G07G 1/0045* (2013.01); *G06K 2209/17* (2013.01)

(58) Field of Classification Search
None
See application file for complete search history.

(56) References Cited

U.S. PATENT DOCUMENTS

| 6,592,033 | B2 * | 7/2003 | Jennings et al. ............... 235/385 |
| 7,578,442 | B2 * | 8/2009 | Knowles et al. ......... 235/462.01 |
| 8,117,071 | B1 * | 2/2012 | Fitch et al. ...................... 705/23 |
| 8,863,016 | B2 * | 10/2014 | Victor ........................... 715/769 |
| 2002/0138374 | A1 | 9/2002 | Jennings et al. |
| 2008/0185431 | A1 * | 8/2008 | Toyokawa et al. ............ 235/385 |
| 2009/0295738 | A1 * | 12/2009 | Chiang ......................... 345/173 |
| 2010/0202702 | A1 * | 8/2010 | Benos et al. .................. 382/200 |
| 2011/0069016 | A1 * | 3/2011 | Victor ........................... 345/173 |
| 2011/0198399 | A1 | 8/2011 | Sano |
| 2012/0119988 | A1 * | 5/2012 | Izumi ............................ 345/156 |
| 2013/0033433 | A1 * | 2/2013 | Rogers et al. ................. 345/173 |

(Continued)

FOREIGN PATENT DOCUMENTS

JP 2003-122757 4/2003

OTHER PUBLICATIONS

Office Action dated Jan. 7, 2014, filed in corresponding Japanese Patent Application No. 2012-038552, with English translation.

(Continued)

*Primary Examiner* — Tahmina Ansari
(74) *Attorney, Agent, or Firm* — Patterson & Sheridan, LLP

(57) ABSTRACT

A recognition system includes an acquisition module configured to acquire an image data generated by an image sensor, a first generation module configured to generate a graphical user interface which contains the image data, and an input module configured to detect an input on the graphical user interface, the input indicating a position designation on the image data. The recognition system further includes a second generation module configured to overlap a frame-line on the image data of the graphical user interface based on the position designation detected by the input module, and a calculation module configured to calculate one or more feature values of an object image within the frame-line.

17 Claims, 12 Drawing Sheets

(56) References Cited

U.S. PATENT DOCUMENTS

2013/0223680 A1* 8/2013 Sugasawa et al. ............ 382/103
2014/0379433 A1* 12/2014 Opperman .................. 705/7.35

OTHER PUBLICATIONS

Hidehiro Naito et al., U.S. Appl. No. 13/690,766, filed Nov. 30, 2012, 73 pages.

Hitoshi Iizaka, U.S. Appl. No. 13/748,996, filed Jan. 24, 2013, 29 pages.

Hidehiro Naito, U.S. Appl. No. 13/737,105, filed Jan. 9, 2013, 58 pages.

Hidehiro Naito, U.S. Appl. No. 13/655,606, filed Oct. 19, 2012, 52 pages.

Hidehiro Naito, U.S. Appl. No. 13/655,600, filed Oct. 19, 2012, 42 pages.

Hidehiro Naito, U.S. Appl. No. 13/653,494, filed Oct. 17, 2012, 40 pages.

Hidehiro Naito, U.S. Appl. No. 13/604,784, filed Sep. 6, 2012, 49 pages.

* cited by examiner

RECOGNITION SYSTEM, RECOGNITION METHOD AND COMPUTER READABLE MEDIUM FOR CALCULATING FEATURE VALUES OF AN OBJECT IMAGE

CROSS-REFERENCE TO RELATED APPLICATION

This application is based upon and claims the benefit of priority from Japanese Patent Application No. 2012-038552, filed Feb. 24, 2012, the entire contents of which are incorporated herein by reference.

FIELD

Embodiments described herein relate generally to a recognition system for specifying an object according to the shape, color, pattern, and the like of the surface of the object.

BACKGROUND

A recognition system specifies the category of an object by analyzing the image data acquired from an image sensor and comparing the image data with feature values for reference. This system may be useful in a bakery or a grocery which deals in some commodities that do not have a barcode label.

DETAILED DESCRIPTION

Figure 1:
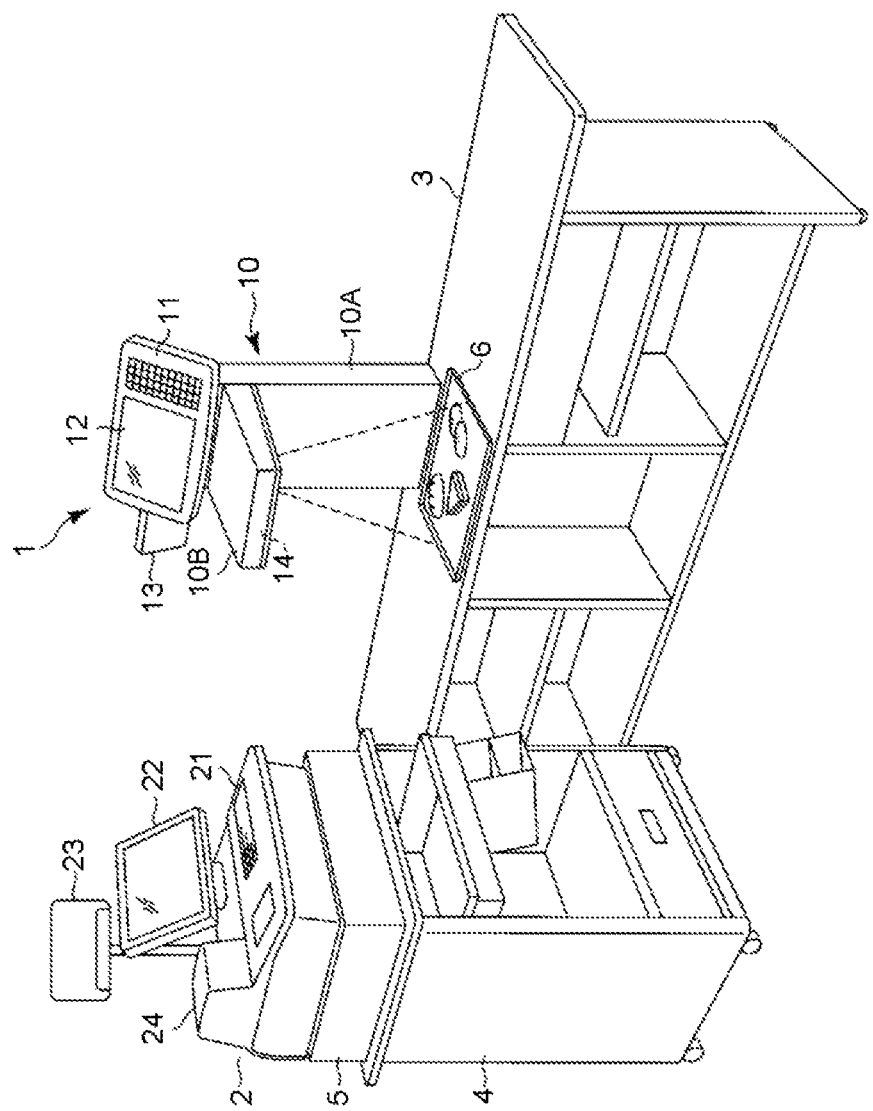
FIG. 1 is an external view of a checkout terminal according to a first embodiment.

According to an embodiment, a recognition system is disclosed. The recognition system comprises an acquisition module configured to acquire an image data generated by an image sensor, a first generation module configured to generate a graphical user interface which contains the image data, and an input module configured to detect an input on the graphical user interface, the input indicating a position designation on the image data. The recognition system further comprises a second generation module configured to overlap a frame-line on the image data of the graphical user interface based on the position designation detected by the input module, and a calculation module configured to calculate one or more feature values of an object image within the frame-line.

According to another embodiment, a recognition method is disclosed. The method comprises acquiring an image data generated by an image sensor, generating a graphical user interface containing the image data, and accepting an input from the graphical user interface, the input indicating a position designation on the image data contained in the graphical user interface. The method further comprises overlapping a frame-line on the image data based on the designated position, calculating at least one calculated feature value of an object image in the frame-line, and storing a plurality of records, each record comprising one or more stored feature values of an object and an information identification code of the object. The method further comprises comparing the at least one calculated feature value to the stored feature values, and based on the comparison, retrieving one of the plurality of records.

According to another embodiment, a non-transitory computer-readable storage medium that stores a computer program is disclosed. The program causes a one or more CPUs to perform a process for recognizing an object, the process comprising acquiring an image data generated by an image sensor, generating a graphical user interface containing the image data, and accepting an input from the graphical user interface, the input indicating a position designation on the image data contained in the graphical user interface. The process further comprises overlapping a frame-line on the image data based on the input indicating the designated position, and calculating one or more feature values of an object image within the frame-line.

Hereinafter, embodiments will be described with reference to the drawings. In the drawings, the same reference numerals denote the same or similar portions respectively.

A first embodiment will be described with reference to FIGS. 1 to 12. FIG. 1 is an external view of a checkout terminal according to the first embodiment.

The first embodiment may be applicable to a commodity reading apparatus installed in a bakery, doughnut shop, grocery or other retail store.

The system includes a commodity reading apparatus 1 and a POS (Point Of Sales) terminal 2. The commodity reading apparatus 1 is installed on a counter 3. The POS terminal 2 and a cash drawer 5 are installed on a register 4. The commodity reading apparatus 1 is electrically connected with the POS terminal 2 through a communication cable.

The counter 3 in an elongated shape is arranged along a passage for customers. Customers move along the counter 3. The register 4 arranged beside the counter 3 is located at the downstream side of the movement direction of customers. A shop assistant may operate the commodity reading apparatus 1 and the POS terminal 2 in the space surrounded by the counter 3 and the register 4.

The commodity reading apparatus 1 has a housing 10A and a sensor unit 10B which is arranged on the front upper end of the housing 10A. An image sensor 14 capable of photographing the object placed on the counter 3 is built in the sensor unit 10B. A keyboard 11, a touch-screen display 12 and a display 13 are arranged on the upper end portion of the housing 10A. The touch-screen display 12 is arranged on the sensor unit 10B.

The image sensor 14 includes a CCD (Charge Coupled Device) sensor, a drive circuit, a lens, and the like. The lens guides the light from the outside to the CCD. The image sensor 14 outputs the image data of the photographing area.

The photographing area refers to the area of the counter 3 which can be converted to image data by the image sensor 14.

Customer may place a tray 6 on which a commodity (e.g. bread, baking food, doughnut, and the like) is placed on the counter 3. As shown in FIG. 1, the shop assistant places the tray 6 under the sensor unit 10B. The image sensor 14 generates the image data of the commodity placed on the tray 6. The touch-screen display 12 displays the image data.

The POS terminal 2 comprises a keyboard 21, a display 22 for shop assistants, a display 23 for customers and a receipt printer 24.

Figure 2:
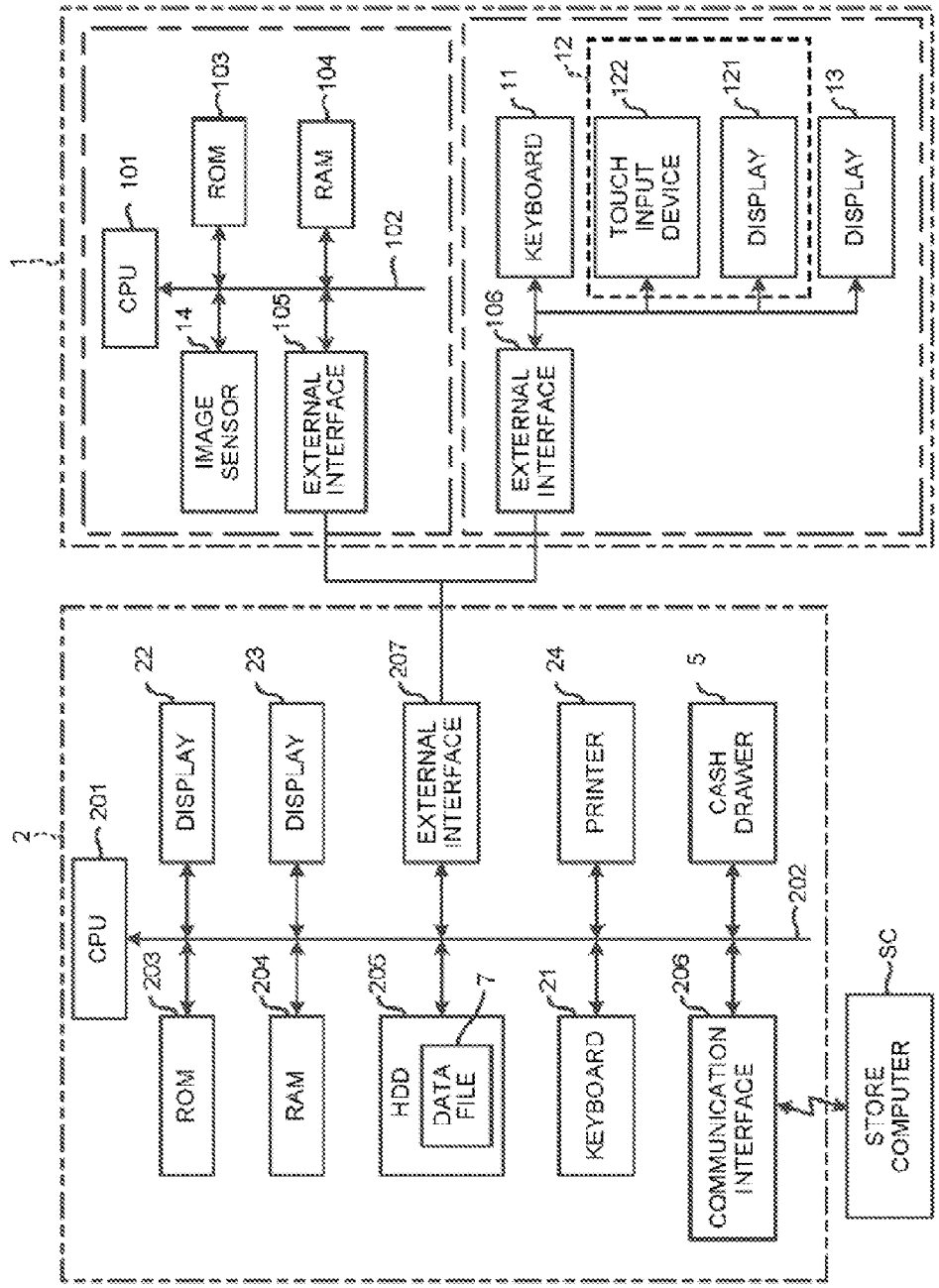
FIG. 2 is a block diagram of the hardware components of a commodity reading apparatus and a POS terminal according to the first embodiment.

FIG. 2 is a block diagram of the hardware components of the commodity reading apparatus 1 and the POS terminal 2. The commodity reading apparatus 1 includes a control unit and an input/output unit. The control unit includes a CPU (Central Processing Unit) 101, a ROM 103, an RAM 104, an image sensor 14 and an external interface 105. The CPU 101 is connected with the ROM 103, the RAM 104, the image sensor 14 and the external interface 105 via bus lines such as an address bus and a data bus. The ROM 103 stores the program executed by the CPU 10.

The input/output unit comprises a keyboard 11, a touch-screen display 12, a display 13 and an external interface 106. The input/output unit is connected with the control unit via an external interface 106. The touch-screen display 12 includes a display 121 and a touch input device 122 which is overlapped on the surface of the display 121. The touch input device 122 detects the position touched by a finger and sends the position data to the CPU 101.

The POS terminal 2 comprises a CPU 201, a ROM 203, a RAM 204, a HDD (Hard Disk Drive) 205, a communication interface 206 and an external interface 207. The CPU 201 is connected with the ROM 203, the RAM 204, the HDD 205 and the external interface 207 via a bus line 202. The bus line 202 is connected with input/output circuits (not shown) of the keyboard 21, the display 22, the display 23, the printer 24 and the cash drawer 5.

The communication interface 206 is connected with a store server SC through a network such as an LAN (Local Area Network). The POS terminal 2 may transmit data with the store server SC. For instance, the POS terminal 2 receives a data file 7 from the store server SC and stores the data file 7 in the HDD 205.

The connection interface 207 is connected with the connection interfaces 105 and 106 via a communication cable. The POS terminal 2 may transmit data between the commodity reading apparatus 1. The POS terminal 2 receives the commodity information read by the commodity reading apparatus 1. The POS terminal 2 sends the data in the data file 7 to the commodity reading apparatus 1.

Figure 3:
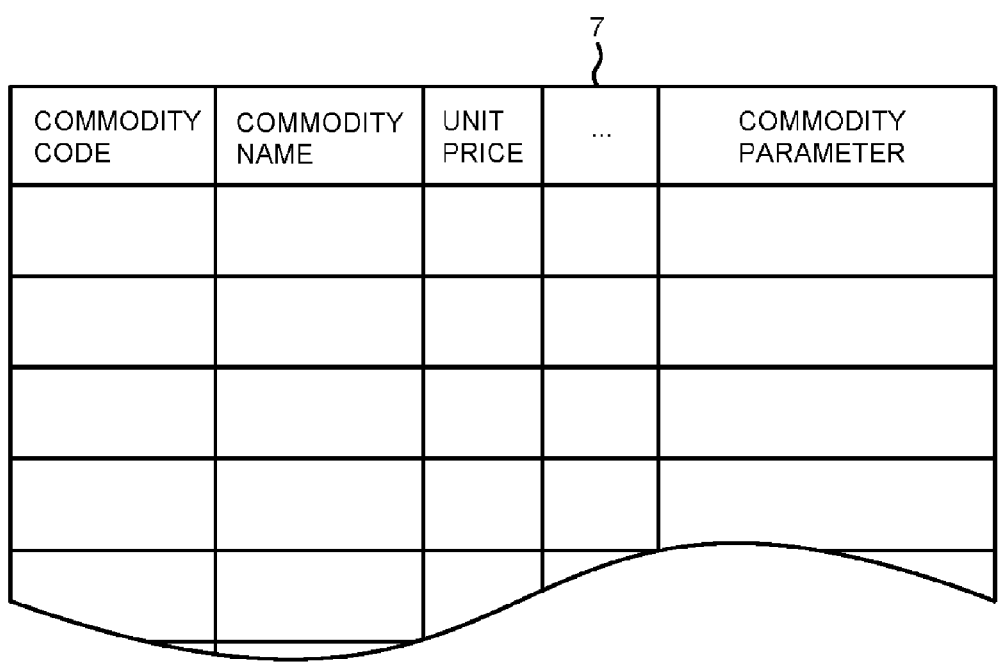
FIG. 3 is a schematic diagram that illustrates the data structure of a data file according to the first embodiment.

FIG. 3 is a schematic diagram that illustrates the data structure of the data file 7. The data file 7 is, for example, a table of the relational database, controlled by SQL (Structured Query Language). The data file 7 includes a plurality of field names which refer to: a commodity code, a commodity name, a unit price, commodity parameters, and the like. The commodity code is a primary key of the table. The primary key is a unique ID specifying the data file 7 (and the corresponding commodity). Commodity parameters refer to the feature values of the standard appearance of the commodity. The feature values are calculated according to a shape of the commodity, a color tone, a pattern, a flatness level, and the like, of a surface of the commodity.

Figure 4:
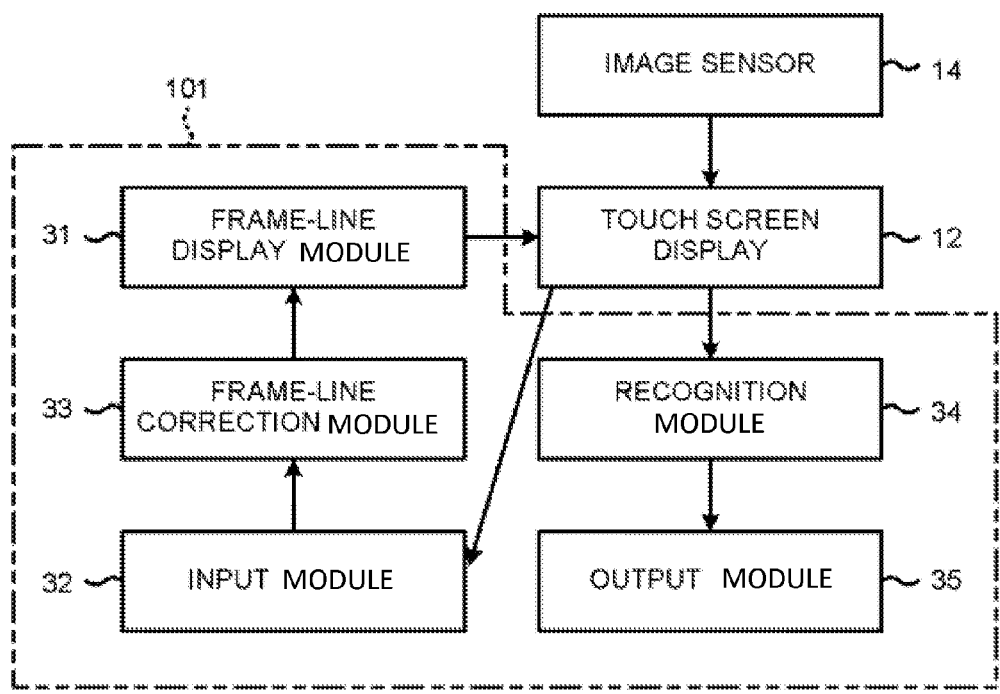
FIG. 4 is a functional block diagram of a program processed by a CPU according to the first embodiment.

FIG. 4 is functional block diagram of the program processed by the CPU 101. The program includes a frame-line display module 31, an input module 32, a frame-line correction module 33, a recognition module 34 and an output module 35. The CPU 101 executes the program based on the position information from the touch input device 122 and the image data generated by the image sensor 14. The frame-line display module 31 displays a frame-line based on the specific operation of the shop assistant on the touch input device 122. The frame-line correction module 33 corrects the size and the shape of the frame-line displayed by the display 12. The input module 32 instructs the frame-line correction module 33 to perform a correction operation based on the specific operation of the shop assistant on the touch input device 122. The recognition module 34 digitizes the image data and calculates feature values of the image data. The output module 35 sends the feature values to the POS terminal 2.

Figure 5:
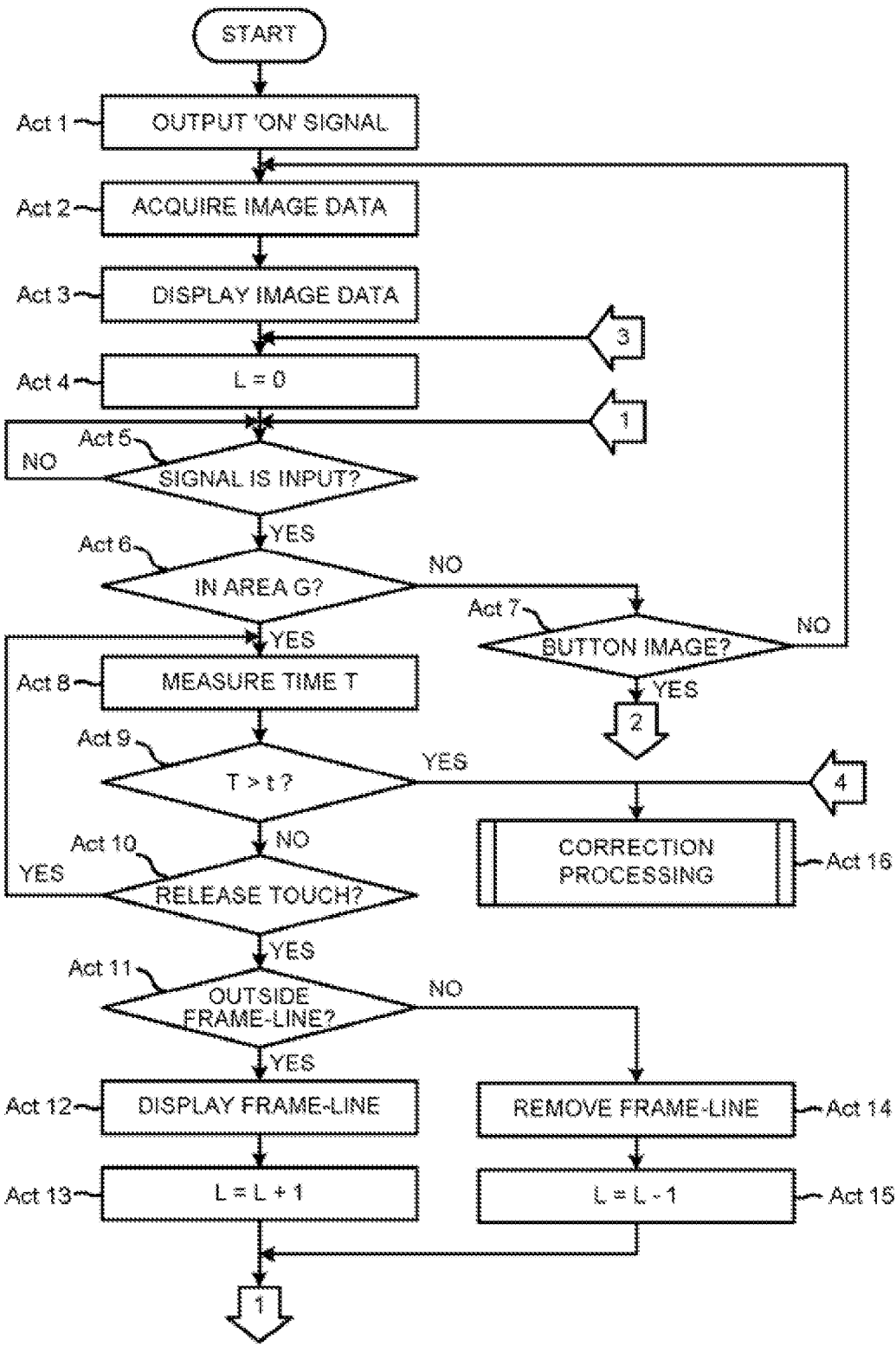
FIG. 5 is a flowchart of a program executed by a CPU according to the first embodiment.
Figure 6:
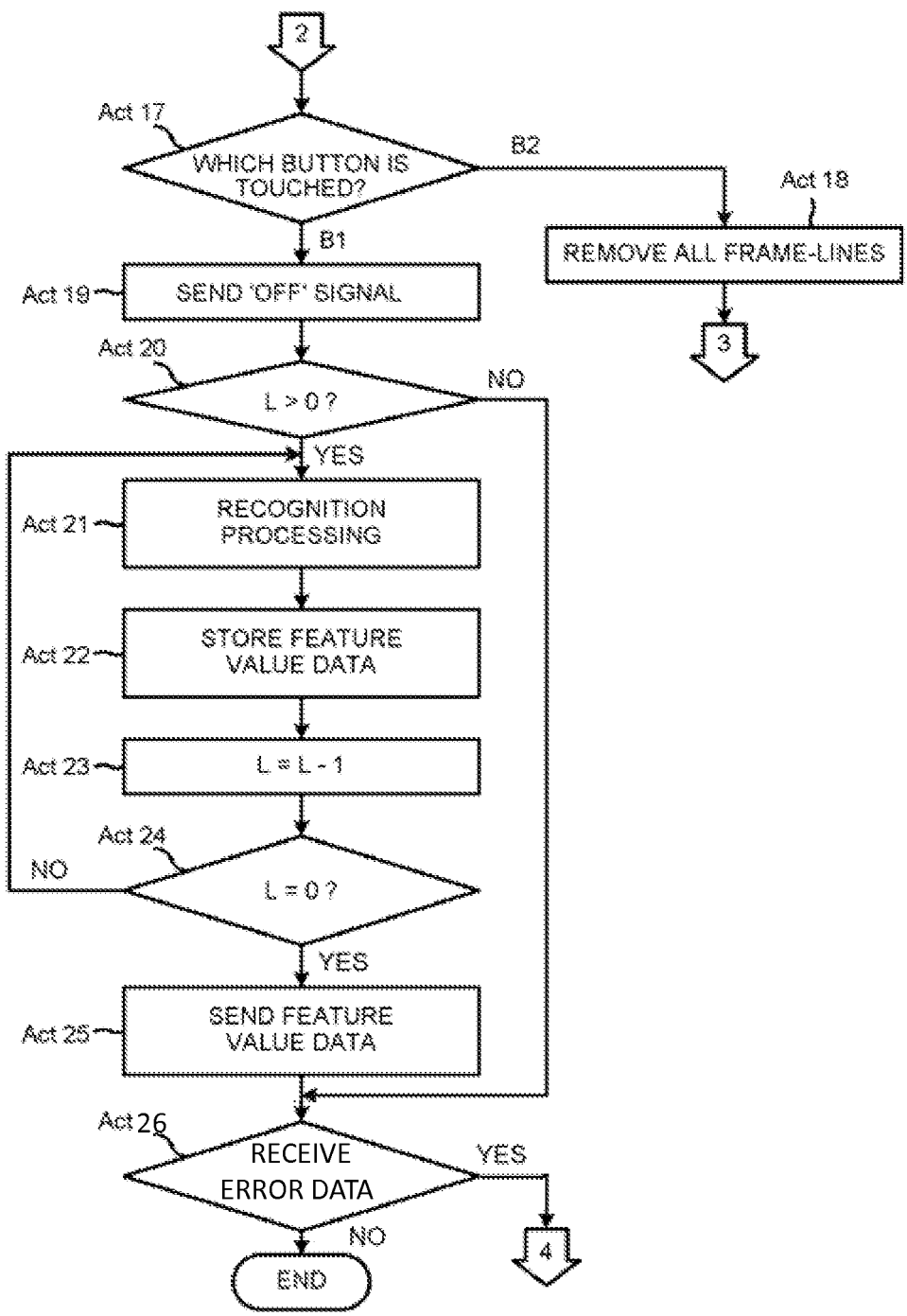
FIG. 6 is a flowchart of a program executed by a CPU according to the first embodiment.
Figure 7:
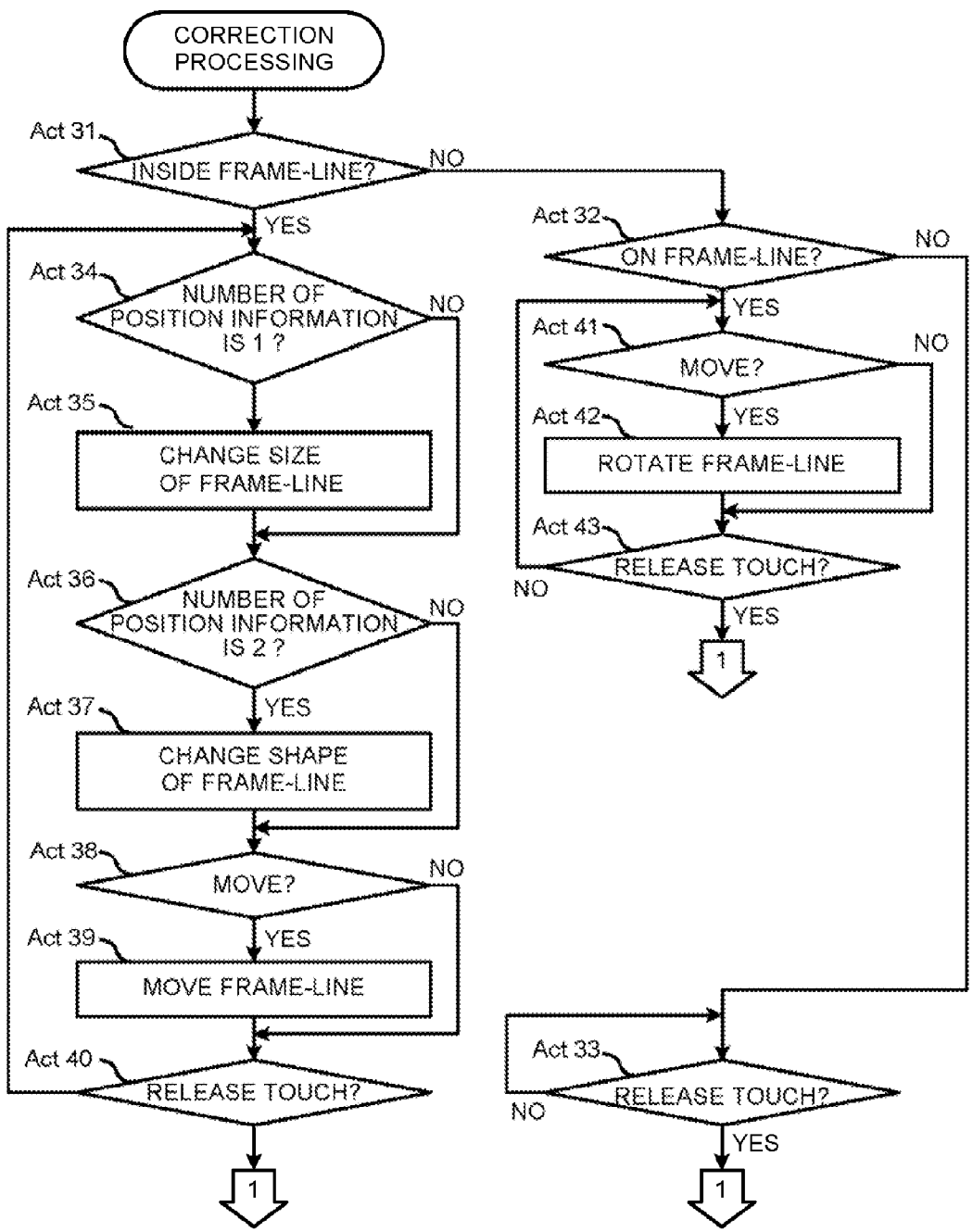
FIG. 7 is a flowchart of a correction program executed by a CPU according to the first embodiment.

FIG. 5-FIG. 7 are flowcharts of the program executed by the CPU 101. The CPU 101 starts the program when the shop assistance places the tray 6 in the photographing area and presses the key 'Start' on the keyboard 11.

The CPU 101 outputs an 'on' signal to the image sensor 14 (Act 1). The image sensor 14 starts to photograph the photographing area according to the 'on' signal. The image sensor 14 generates a image data, and stores the image data in the RAM 104 in sequence.

The CPU 101 acquires the image data from the RAM 104 (Act 2). The CPU 101 generates a graphical user interface (GUI) containing the image data and sends the generated GUI to the touch-screen display 12. The display 121 displays the GUI (Act 3). The CPU 101 resets the counter L to be '0' (Act 4). The RAM 104 includes an area for the counter L.

Figure 8:
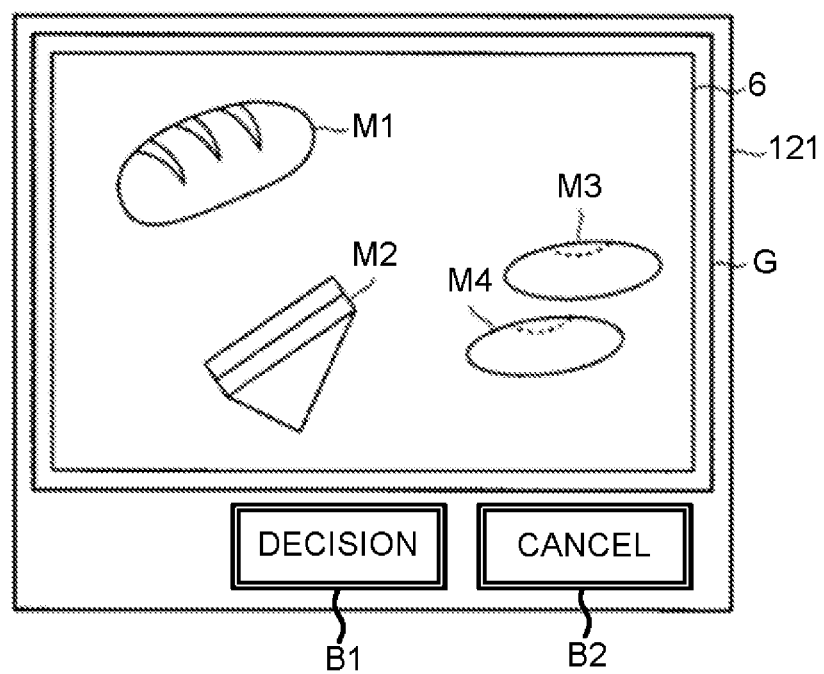
FIG. 8 is a default GUI displayed by a display according to the first embodiment.

FIG. 8 is a default GUI displayed by the display 121. The GUI includes a button B1, a button B2 and an area G. When the shop assistant touches the input device 122, the touch input device 122 sends the position information to the CPU 101. When the position refers to the button B1, the CPU 101 determines a 'Decision' operation. When the position refers to the button B2, the CPU 101 determines a 'Cancel' operation. The image data generated by the image sensor 14 includes the tray 6 and the commodities M1, M2, M3 and M4 carried on the tray 6. The display 121 displays the image data in the area G. In addition, the keyboard 11 may also have a button B1 and a button B2. The shop assistant may choose either of the GUI and the keyboard 11 for inputting operations.

The CPU 101 waits to receive the touch position information from the touch input device 122 (Act 5). After receiving the touch position information from the touch input device 122, the CPU 101 determines whether the touch position is in or outside the area G (Act 6). If the touch position is outside the area G, the CPU 101 determines whether or not the touch position is on the button B1 or the button B2 (Act 7). If the touch position is on neither of the button images, the CPU 101 returns to execute ACT 2 to acquire next image data from the RAM 104 (Act 7: NO).

If the touch position is in the area G, a timer arranged in the CPU 101 starts to measure the time T during which the shop assistant touches the touch input device 122 (ACT 6 is YES; ACT 8). In Act 9, The CPU 101 determines whether or not the time T exceeds a predetermined time t (e.g. 2 s). If the time T is within the time t, the CPU 101 determines whether or not a touch position is being received from the touch input device 122 (Act 10). In the case where the shop assistant continues to touch the touch input device 122, the CPU 101 returns to execute Act 8 to continue to measure the time T.

If the user takes hands off from the touch input device 122 before the time T exceeds the time t, the CPU 101 determines whether or not the touch position is outside the frame-line described below (Act 10 is YES; Act 11). In this embodiment, the outside of a frame-line is defined not to include line on the frame-line. If the position is outside the frame-line, the CPU 101 overlaps a preset rectangular frame-line with a center of the touch position with the image data in the area G (Act 12). The CPU 101 only adds '1' on the counter L (ACT 13) and then returns to execute ACT 5. The value of the counter L means a number of the frame-lines displayed in the display 121.

When the touch position is not outside the frame-line, the CPU 101 removes the frame-line outside the touch position or the frame-line touched by the shop assistant (Act 11 is NO; Act 14). The CPU 101 subtracts '1' from the counter L (Act 15) and then returns to execute Act 5.

If the time T exceeds the time t, the CPU 101 executes a frame-line correction processing (Act 9 is YES; Act 16), which will be described in detail below.

FIG. 6 is a flowchart of the CPU 101 in the case where the button images are touched. When the touch position is on a button image, the CPU 101 determines whether or not the touch position is the button B1 or the button B2 (Act 7 is YES; Act 17). When the touch position is on the button B2, the CPU 101 removes all the frame-lines in the area G (ACT 18) and then proceeds to execute ACT 4.

When the touch position is on the button B2, the CPU 101 sends an 'off' signal to the image sensor 14 (Act 19). The image sensor 14 stops photographing according to the 'off' signal.

The CPU 101 determines whether or not the counter L is greater than '0' (Act 20). This processing is ended when the counter L is '0' (Act 20 is NO-END).

When the counter is greater than '0', the CPU 101 carries out a recognition processing based on the image in one frame-line (Act 20 is YES; Act 21). The CPU 101 first digitizes the image in the frame-line. The CPU 101 extracts an outline from the digitized image. If the outline of the commodity is extracted, the CPU 101 calculates the feature values based on the shape of the commodity, the color tone, the pattern and the flatness level of the surface of the commodity according to the image in the outline. The CPU 101 temporarily stores the feature values in the RAM 104 (Act 22).

The CPU 101 subtracts '1' from the counter L (Act 23). The CPU 101 determines whether or not the counter L is '0' (Act 24). When the counter is greater than '0', the CPU 101 returns to execute Act 21 to recognize the images in other frame-lines (Act 24 is NO).

When the counter L is '0', the CPU 101 sends the data of the feature values stored in the RAM 104 to the POS terminal 2 (ACT 25).

When the POS terminal 2 receives the feature values of each commodity from the commodity reading apparatus 1, the CPU 201 compares the feature value with the commodity parameters presented in each record stored in the data file 7. The CPU 201 specifies a commodity code having the commodity parameters that most closely approximate the feature value.

The CPU 201 reads a commodity name and a unit price from the data file 7 based on the specified commodity code. The CPU 201 calculates a sales amount. The CPU 201 records the sales data containing the commodity code, the commodity name, the unit price, the sales piece and the sales amount in the RAM 204.

FIG. 7 is a flowchart of the frame-line correction processing of Act 16. If the time T exceeds the time t, the CPU 101 determines whether or not the touch position is inside the frame-line or on the frame-line (Act 31, Act 32). If the determination result of Act 31 and Act 32 is NO, the CPU 10 waits to release the touch (Act 33). If the touch is released, the CPU 101 returns to execute Act 5 and then waits for the next touch input.

On the other hand, when the touch position is inside the frame-line, the CPU 101 determines whether or not the number of the pieces of position information from the touch input device 122 is 1 (Act 31 is YES; Act 34). If the determination result of Act 34 is YES, the CPU 101 allows a size correction on the frame-line. The CPU 101 scales up or down the frame-line (Act 35).

If the determination result of Act 34 is NO, the CPU 101 determines whether or not the number of the pieces of position information from the touch input device 122 is greater than 2 (Act 36). If the determination result of Act 36 is YES, the CPU 101 allows a shape correction on the frame-line. The CPU 101 changes the rectangular frame-line to a circular one or the circular frame-line to a rectangular one (Act 37).

If the determination result of Act 36 is NO, the CPU 101 determines whether or not the position information from the touch input device 122 is changed continuously (Act 38). If the determination result of Act 38 is YES, the CPU 101 allows a position correction on the frame-line. Then, the CPU 101 moves the frame-line using a direction of movement of the position information (Act 39).

The CPU 101 determines whether or not the touch position is released (Act 40). If the determination result of Act 40 is NO, the CPU 101 returns to execute Act 34. If the determination result of Act 40 is YES, the CPU 101 returns to execute Act 5.

If the touch position is on the frame-line, the CPU 101 determines whether or not the position information from the touch input device 122 is changed continuously (Act 32 is YES; Act 41). If the determination result of Act 41 is YES, the CPU 101 allows an angle correction on the frame-line. The CPU 101 rotates the frame-line according to the change direction and the change distance of the position information (Act 42). The frame-line may turn around its center.

The CPU 101 determines whether or not the touch position is released (Act 43). If the determination result of Act 43 is NO, the CPU 101 returns to execute Act 41. If the determination result of Act 43 is YES, the CPU 101 returns to execute Act 5.

The frame-line display module 31 may execute Act 12. The input module 32 may execute Act 9, Act 31, Act 32, Act 34, Act 36 and Act 38. The frame-line correction module 33 may execute Act 35, Act 37, Act 39 and Act 42. The recognition module 34 may execute Act 21. The output module 35 may execute Act 25.

Figure 9:
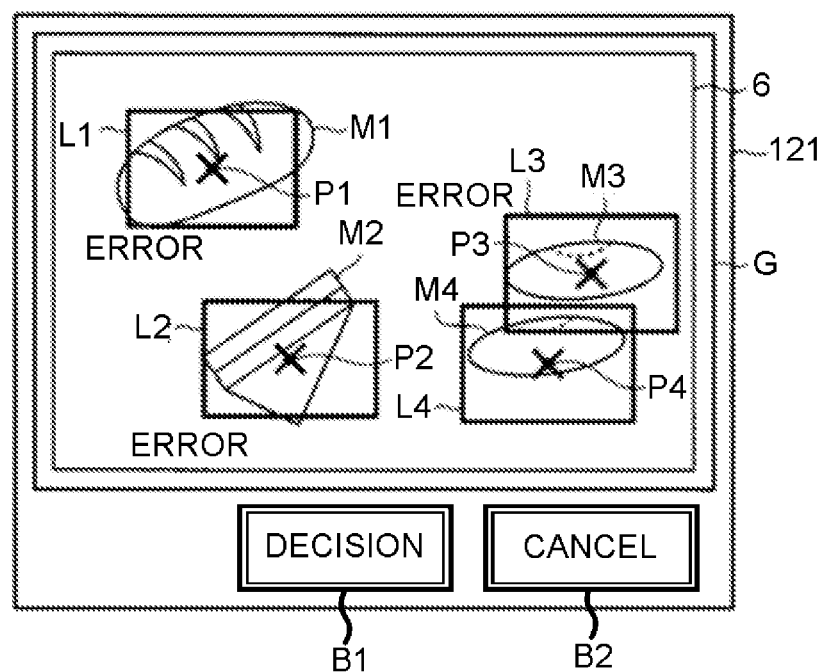
FIG. 9 is a GUI which displays the frame-lines in default sizes according to the first embodiment.

When the shop assistant operates the 'Start' key on the keyboard 11, the commodity reading apparatus 1 generates the default GUI having the image data generated by the image sensor 14 in the area G. The touch display 12 may display the default GUI as shown in FIG. 8. A frame-line correction method is now described. The shop assistant touches images of commodities M1, M2, M3 and M4, respectively. The time interval T of each touch is shorter than the time interval t. FIG. 9 is a GUI which displays the initial frame-lines in default size. When the shop assistant touches the commodity on the area G, the frame-line display module 31 generates initial frame-lines L1, L2, L3 and L4 having a default rectangular shape by taking touch positions P1, P2, P3 and P4 as centers.

Figure 10:
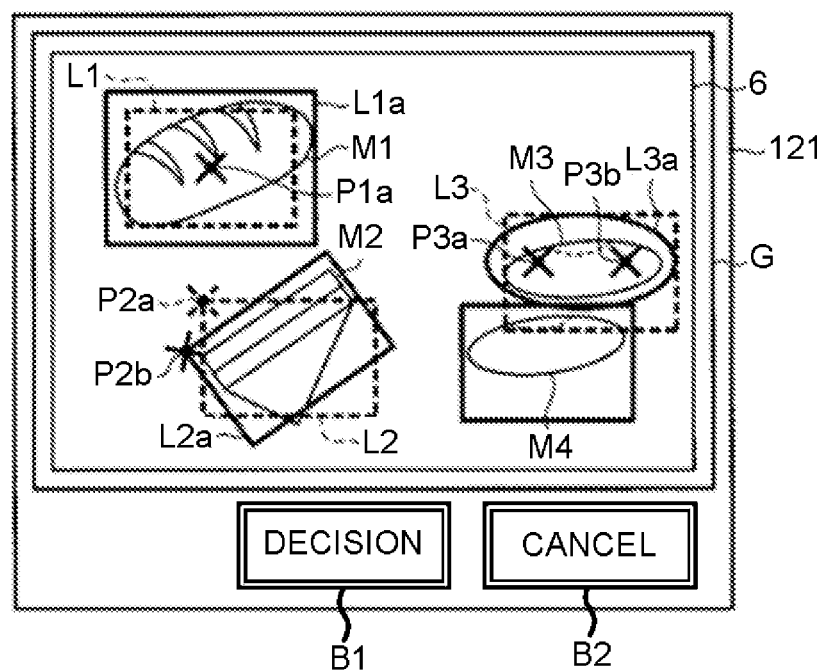
FIG. 10 is a GUI correcting the frame-lines according to the first embodiment.

The initial frame-line L1 is smaller than the commodity M1 in shape. As a result, the recognition module 34 fails to extract a complete outline, so the shop assistant needs to scale up the frame-line L1. The shop assistant touches again the one touch position inside of the initial frame-line L1 and waits for the elapse of the time t in this state. As shown in FIG. 10, the frame-line correction module 33 movably scales up the frame-line L1 by taking the touch position P1a as the center of the frame-line L1. If the frame-line L1 is scaled up enough to cover the shape of the commodity M1, then the shop assistant releases the touch. The frame-line scaled up enough to cover the shape of the commodity M1 is represented by a label L1a.

In FIG. 10, the frame-line Ln is represented by dotted lines, and the frame-line Lna is represented by solid lines. The initial frame-line Ln and the frame-line Lna may also be distinguished by the different colors, thicknesses or types of the lines.

When one piece of position information is input for more than the time t from the touch input device 122, the frame-line L1 is, for example, movably scaled up to a size 2 times as large as the default size, and then scaled down, for example, a half size of the default size. The frame-line L1 is repeatedly scaled up and down as long as one piece of position information is input continuously. The size correction action may realize a scaling down operation first.

The commodity M2 may be located inside the frame-line L2 by rotating the frame-line L2 in a default size by a given angle. For instance, the shop assistant touches the position P2a on the frame-line L2 and moves fingers downwards without taking the touching hand off from the display screen. The frame-line correction module 33 rotates the frame-line L2 counterclockwise following the movement of the touch position. The shop assistant releases the touch at the position P2b. The commodity M2 is entered into the frame-line L2. This position is represented by a label L2a.

The outline of the commodity M3 is wholly located inside the frame-line L3 in the default size. However, as the frame-line L3 contains a part of the commodity M4, the recognition module 34 may extract an error outline. The shop assistant touches two positions P3a and P3b for a time longer than the time t. The frame-line correction module 33 corrects the rectangular frame-line L3 to be an ellipsoidal frame-line L3A which sets a focus to the position P3a and the position P3b. The shop assistant releases the touch only when the commodity M3 enters the inside of the frame-line L3a.

Similarly, the frame-line correction module 33 may correct a frame-line to be a regular triangle based on three pieces of position information or to be a standard circle based on four pieces of position information.

The outline of the commodity M4 is entirely inside of the frame-line L4. Moreover, the frame-line L4 contains no part of other commodities. Therefore, there is no need to change the size or shape of the frame-line L4.

Figure 11:
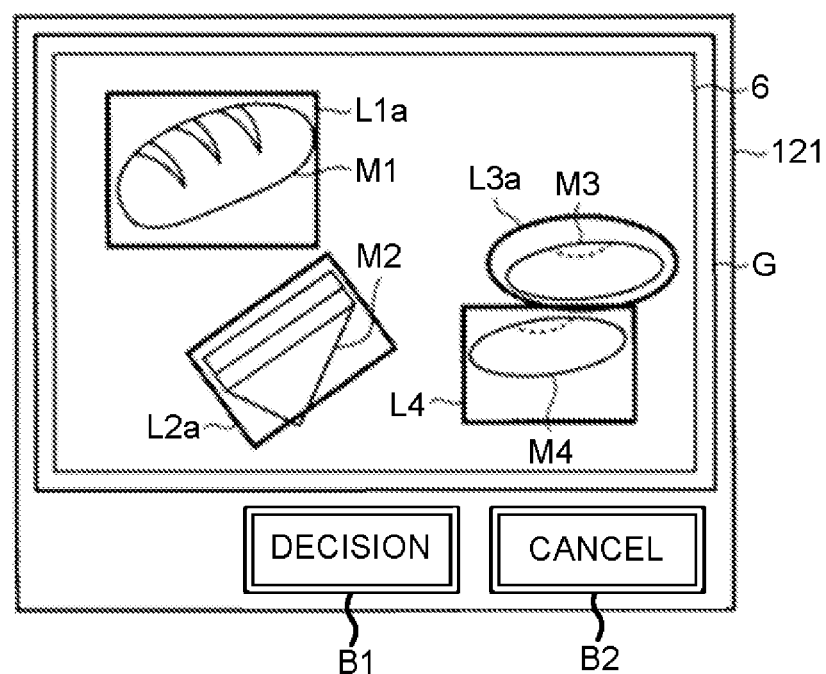
FIG. 11 is a GUI resulting from a correction operation on the frame-lines according to the first embodiment.
Figure 12:
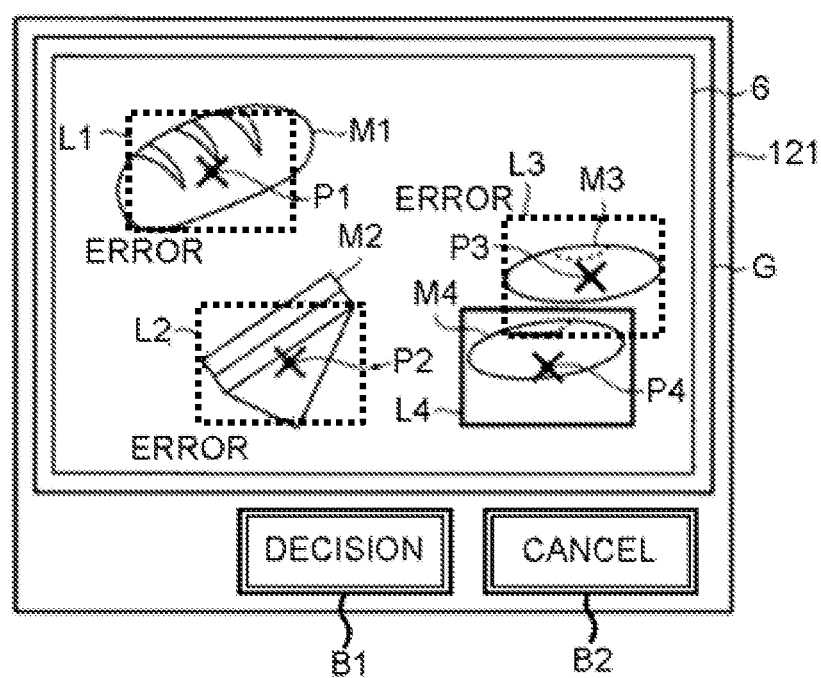
FIG. 12 is a GUI resulting from an error according to the first embodiment

After the shop assistant completes the frame-line correction, the outlines of the commodities M1, M2, M3 and M4 are entirely inside of frame-lines L1a, L2a, L3a and L4a, respectively, as shown in FIG. 11. The shop assistant touches the button B1. The recognition module 34 calculates the feature values A of the commodity M1 based on the image data in the frame-line L1a, the feature values B of the commodity M2 based on the image data in the frame-line L2a, the feature values C of the commodity M3 based on the image data in the frame-line L3a, and the feature values D of the commodity M4 based on the image data in the frame-line L4a. The CPU 101 stores the feature values in the RAM 104.

The output module 35 sends the feature values to the POS terminal 2. The CPU 201 of the POS terminal 2 compares the commodity parameters stored in the data file 7 with the feature values A. The CPU 201 acquires the commodity code of a record most approximate in commodity parameter to the feature values A. The CPU 201 carries out the same recognition processing on the feature values B, C and D. If the CPU 201 is unable to identify a record that approximates in commodity parameter to the feature values A (or B, C or D) above a predetermined threshold, an error is determined. For example, if the CPU 201 is unable to complete recognition processing for the commodities within L1, L2 and L3, but is able to complete recognition processing for the commodity within L4, the display 12 may display the screen shown in FIG. 12. The display 12 may also display an error message such as "ERROR" indicating that there is no record which has a commodity parameter similar to the received feature value. An error state for each frame-line may be displayed in real-time or near real-time, even before button B1 has been pushed. Thus, the shop assistant is notified which frame-lines need to be adjusted prior to initiating recognition processing. This is shown in FIG. 9.

In this embodiment, the recognition module 34 only carries out a recognition processing on the image in the area designated by the shop assistant. Therefore, the recognition module 34 is freed from dividing a plurality of commodity areas according to image data, which avoids the errors caused by an error division and reduces the load of the CPU 101.

The shop assistant may also implement a simple operation to display the frame-lines, resulting in an improvement in working efficiency.

As shown in FIG. 9 and discussed above, the frame-line L4 needs no correction. However, frame-lines L1, L2 and L3 need correcting. The frame-line L4 is displayed by, for example, solid lines while frame-lines L1, L2 and L3 are displayed by other lines (e.g. dotted lines). This can be seen in FIG. 12. Therefore, the shop assistant may make a determination on whether or not a correction is needed.

Moreover, this embodiment may also be applied in, for example, an automatic self-help checkout system, without any limitation to hardware components of the checkout system. For instance, the CPUs of a plurality of servers in a cloud network may cooperate to execute the program.

The functions explained in the embodiment may be configured using hardware or may be realized by causing a computer to read a computer program describing the functions using software. The functions may be configured by selecting the software or the hardware as appropriate.

Further, the functions can also be realized by causing the computer to read the computer program stored in a not-shown recording medium. A recording form of the recording medium may be any form as long as the recording medium can record the computer program and can be read by the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition system, comprising:
    an acquisition module configured to acquire an image data generated by an image sensor;
    a first generation module configured to generate a graphical user interface which contains the image data;
    an input module configured to detect an input on the graphical user interface, the input indicating a position designation on the image data;

a second generation module configured to overlap a frame-line on the image data of the graphical user interface based on the position designation detected by the input module;
a correction module configured to change a shape of the frame-line according to a correction input detected by the input module; and
a calculation module configured to calculate one or more feature values of an object image within the frame-line, wherein
if the input module detects the input corresponding to the position designation in the frame-line for a time longer than a preset time period, the correction module changes the shape of the frame-line according to the correction input.

2. The recognition system according to claim 1, wherein the input module is configured to detect a plurality of inputs, each corresponding to a different position designation,
the second generation module is configured to overlap a plurality of frame-lines on the imaged data of the graphical user interface, each frame line corresponding to one of the different position designations.

3. The recognition system according to claim 1, wherein the graphical user interface includes a button, and
when the input module detects an input corresponding to the button, the calculation module is configured to start to calculate the one or more feature values.

4. The recognition system according to claim 1, further comprising;
a storage module configured to store a plurality of records, each record comprising one or more stored feature values of an object and an information identification code of the object; and
a retrieval module configured to retrieve one of the plurality of records based on a comparison between the stored feature values and the one or more feature values calculated by the calculation module;
wherein
when the retrieval module is incapable of retrieving one of the plurality of records, the second generation module changes a display state of the frame-line.

5. The recognition system according to claim 1, wherein if the input module detects an input corresponding to a second position designation outside the frame-line overlapped on the graphical user interface, the second generation module is configured to overlap a second frame-line on the image data of the graphical user interface based on the second position designation detected by the input module.

6. The recognition system according to claim 1, wherein the second generation module is configured to display the frame-line in a predetermined size at the designated position.

7. A recognition method comprising:
acquiring an image data generated by an image sensor;
generating a graphical user interface containing the image data;
accepting an input from the graphical user interface, the input indicating a position designation on the image data contained in the graphical user interface;
overlapping a frame-line on the image data based on the designated position;
changing the shape of the frame-line if the input indicating the position designation is detected inside the frame-lane for a time longer than a predetermined time period;
calculating at least one calculated feature value of an object image in the frame-line;
storing a plurality of records, each record comprising one or more stored feature values of an object and an information identification code of the object;
comparing the at least one calculated feature value to the stored feature values; and
based on the comparison, retrieving one of the plurality of records.

8. The recognition method according to claim 7, further comprising:
detecting a plurality of inputs, each corresponding to a different position designation; and
overlapping a plurality of frame-lines on the image data of the graphical user interface, each frame line based on one of the different position designations.

9. The recognition method according to claim 7, wherein the graphical user interface contains a button, and
calculating the at least one calculated feature value is in response to accepting an input corresponding to the button.

10. The recognition method according to claim 7, further comprising:
changing the display state of the frame-line if a record having stored feature values that are similar to the calculated feature values cannot be retrieved.

11. The recognition method according to claim 7, further comprising:
changing the shape of the frame-line in response to detecting a predetermined input.

12. The recognition method according to claim 7, further comprising:
deleting the frame-line if the input indicating the position designation is detected inside the frame-line for a time shorter than a preset period of time.

13. A non-transitory computer-readable storage medium that stores a computer program for causing one or more CPUs to perform a process for recognizing an object, the process comprising:
acquiring an image data generated by an image sensor;
generating a graphical user interface containing the image data;
accepting an input from the graphical user interface, the input indicating a position designation on the image data contained in the graphical user interface;
overlapping a frame-line on the Image data based on the input indicating the designated position;
calculating one or more feature values of an object image within the frame-line; and
deleting the frame-line if the input indicating the position designation is detected inside the frame-line for a time shorter than a preset time period.

14. The non-transitory computer-readable medium that stores a computer program for causing a computer to perform a process for recognizing an object according to claim 13, the process further comprising;
storing a plurality of records, each record comprising one or more stored feature values of an object and an information identification code of the object;
comparing the one or more feature values to the stored feature values; and
based on the comparison, retrieving one of the plurality of records.

15. The non-transitory computer-readable medium that stores a computer program for causing a computer to perform a process for recognizing an object according to claim 13, the process further comprising;

detecting a plurality of inputs, each corresponding to a different position designation; and overlapping a plurality of frame-lines on the image data of the graphical user interface, each frame line based on one of the different position designations.

16. The non-transitory computer-readable medium that stores a computer program for causing a computer to perform a process for recognizing an object according to claim 13, the process further comprising;

changing the shape of the frame-line in response to detecting a predetermined input.

17. The recognition system according to claim 2, wherein the calculation module is configured to calculate one or more feature values of an object within each frame-line, the system further comprising:

a storage module configured to store a plurality of records, each record comprising one or more stored feature values of an object and an information identification code of the object; and a retrieval module configured to retrieve a plurality of records, each retrieved record based on a comparison between the one or more feature values corresponding to one of the frame-lines and the stored feature values.

\* \* \* \* \*